US008714110B2

(12) United States Patent
Savoia et al.

(10) Patent No.: US 8,714,110 B2
(45) Date of Patent: May 6, 2014

(54) AUTOMATED SYSTEM AND METHOD FOR DISASSEMBLING, HANDLING AND REASSEMBLING DEVICES FOR CONTAINING ANIMALS IN A LAB ANIMAL ROOM

(75) Inventors: Luciano Savoia, Saronno (IT); Roberto Tosi, Luino (IT)

(73) Assignee: IWT S.R.L., Casale Litta (IT)

( * ) Notice: Subject to any disclaimer, the term of this patent is extended or adjusted under 35 U.S.C. 154(b) by 547 days.

(21) Appl. No.: 12/613,021

(22) Filed: Nov. 5, 2009

(65) Prior Publication Data

US 2011/0054669 A1  Mar. 3, 2011

(30) Foreign Application Priority Data

Sep. 1, 2009 (IT) .............................. MI2009A1521

(51) Int. Cl.
*A01K 1/01* (2006.01)
(52) U.S. Cl.
USPC ............................ 119/452; 414/411; 119/458
(58) Field of Classification Search
USPC ......... 119/452, 453, 455, 456, 458, 459, 475, 119/417, 843; 414/411
See application file for complete search history.

(56) References Cited

U.S. PATENT DOCUMENTS

| 5,735,664 | A | * | 4/1998 | Jerome ......................... 414/393 |
| 7,114,462 | B2 | * | 10/2006 | Austin et al. .................. 119/458 |
| 2005/0166860 | A1 | | 8/2005 | Austin et al. |
| 2006/0185611 | A1 | | 8/2006 | Copeland et al. |

FOREIGN PATENT DOCUMENTS

| JP | 5016087 A1 | 1/1993 |
| WO | 0124618 A1 | 4/2001 |

OTHER PUBLICATIONS

Search Report dated Mar. 15, 2010, IT MI20091521, pp. 1-7.

* cited by examiner

*Primary Examiner* — Monica Williams
*Assistant Examiner* — Brian M O'Hara
(74) *Attorney, Agent, or Firm* — Abelman, Frayne & Schwab (57) ABSTRACT

The present invention concerns a system for the disassembly, handling and reassembly of animal containment cages for use in a lab animal room, comprising automated means for handling and moving the cages (2, 3), at least one disassembly station (60) where said cages are placed during their disassembly, and a control unit that governs said automated means (2, 3) as a function of the parameters identified by suitable detection sensors (62, 63, 64) located at said disassembly station.
The present invention also concerns the method implemented by said system.

14 Claims, 6 Drawing Sheets

AUTOMATED SYSTEM AND METHOD FOR DISASSEMBLING, HANDLING AND REASSEMBLING DEVICES FOR CONTAINING ANIMALS IN A LAB ANIMAL ROOM

CROSS REFERENCE TO RELATED APPLICATION

This application claims benefit under 35 USC 119 to Italian Application No. MI2009A001521, filed on Sep. 1, 2009.

FIELD OF THE INVENTION

The present invention concerns an automated system for handling devices for containing animals, and particularly for the containment devices used to house animals used in scientific research.

PRIOR ART

It is common knowledge that research laboratories use shelves to contain a plurality of devices (generally cages) suitable for containing lab animals under controlled environmental conditions. In particular, such cages include a plurality of structural elements that are designed to serve various purposes, but they all comprise at least one tray suitable for containing the animals, at least one feeder, generally with a mesh structure or metal grid, and at least one lid for hermetically sealing the cage.

The tray containing the animals is filled with a litter or bedding of material, normally sawdust, suitable for absorbing the animals' excrement, and this bedding material must consequently be periodically replaced. In addition, the containment cage must also be suitably washed and sterilised, a procedure that is normally done by the operator with the aid of a discontinuous procedure, typically using machines for washing general items or trays, or by means of continuous washing machines, based on the use of a conveyor belt, for instance.

In any case, before the washing procedure, be it continuous or discontinuous, the operator has to collect the soiled cage containing the bedding from a shelf coming from the lab animal room, then open the cage or at least remove the lid and the feeder, emptying it into a specific hopper for collecting the bedding and then place all the disassembled parts in the washing machine or on the conveyor belt serving the continuous washing machine.

All these procedures for emptying and disassembling the cage, and placing them in the washing machine or on a movable shelf for feeding them into the washing machine, are currently handled manually by operators with a considerable loss of time, and at the risk of their direct exposure to allergens (which makes it compulsory for them to use a number of items of protective equipment) and with repeated movements that make this job boring, and consequently lowering the operators' attention levels and further slowing the procedures or extending the time it takes to clean the cages. The time that the operators or researchers spend disassembling and emptying the cages is time subtracted from the research activity proper.

SUMMARY OF THE INVENTION

The main aim of the present invention is thus to produce a system and a method for the automated opening, disassembling and emptying of lab animal containment devices.

Within the context of this aim, one object of the present invention is to reduce the time it takes to disassemble, empty and wash the cages, with a consequent optimisation of the laboratory activity times.

This aim and this and other objects that will emerge more clearly later on are achieved by a system for handling animal containment cages in a lab animal room, and particularly for disassembling and emptying said cages, comprising automated means for the handling and movement of the cages, at least one disassembly station where said cages are positioned during the disassembly procedure, complete with a plurality of sensors for detecting parameters relating to the presence and position of the cage, a control unit for said automated means that receives the signal corresponding to the parameters detected by said detection sensors, and that controls the automated means as a function of said parameters, and by the method implemented by said system.

BRIEF DESCRIPTION OF THE DRAWINGS

Further characteristics and advantages of the present invention will emerge more clearly from the following detailed description, given as a non-limiting example and illustrated in the attached figures, wherein.

DETAILED DESCRIPTION OF THE INVENTION

Figure 1:
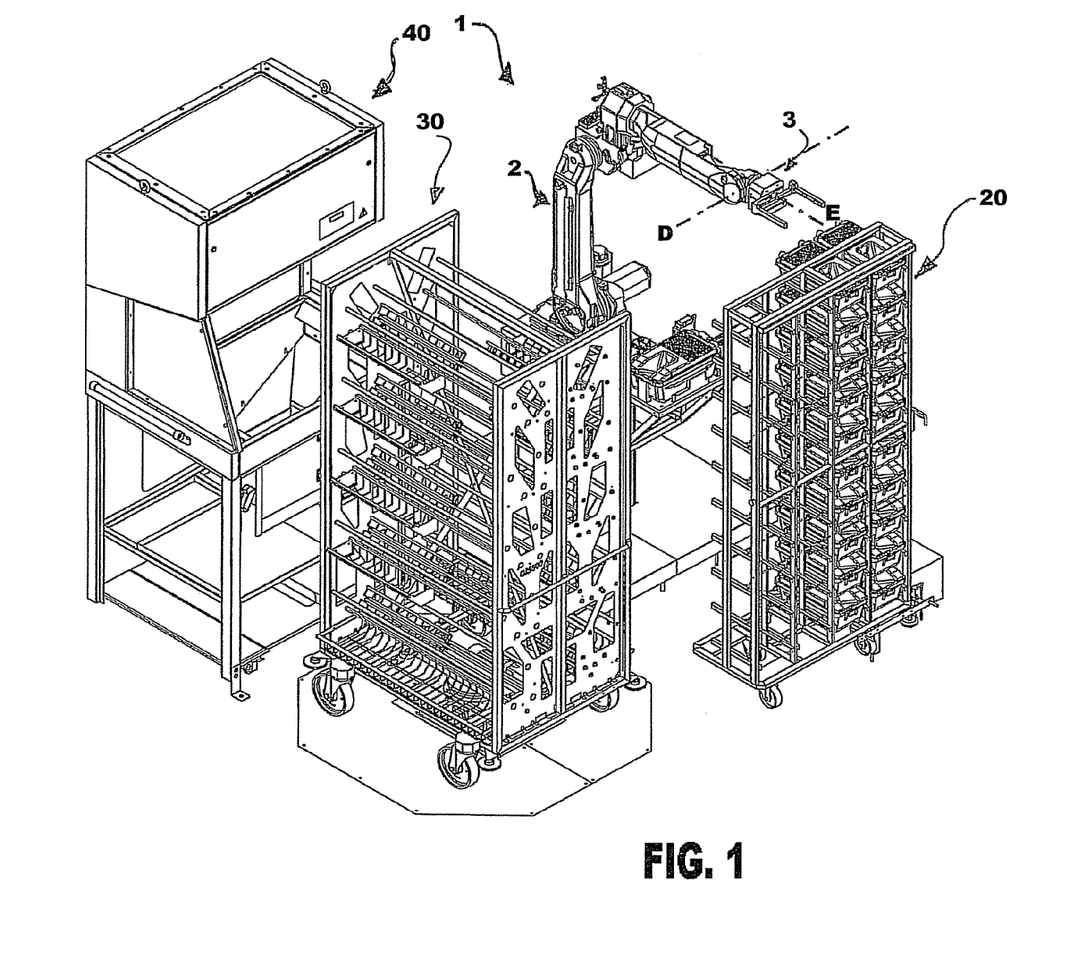
FIG. 1 shows an overall perspective view of the system according to the present invention in a possible embodiment suitable for application to a discontinuous washing process.

With reference to FIG. 1, the system 1 according to the present invention comprises automated means for handling and moving the cages.

In particular, said automated means may preferably comprise a robot and, even more preferably, an anthropomorphous robotic arm 2.

Said automated means of movement also comprise at least one gripping member 3, connected to the movable end of said robotic arm 2, and specifically structured to be able to hold the assembled cage and/or single components thereof. The robotic arm 2 is designed so that it can be oriented in space in order to position the gripping member 3 in any point in space, thanks to the simultaneous presence of a plurality of axes of movement A, B, C, D and E.

The closed, soiled cages are carried with the aid of a transport cart 20, in which they are stacked tidily. The transport cart 20 is then placed alongside the robotic arm 2, in a position that enables the robotic arm to reach each cage. Since the transport carts of known type are normally mounted on wheels specifically to facilitate their displacement, for such a cart 20 to be suitable for use with the automated system according to the present invention special locking means must be provided to block the cart firmly in a previously-established position, so that it is held steady, in the right position in relation to the robotic arm, while said arm transfers the cages.

Said blocking means suitably comprise a clamping hook designed to hold the cart within a corresponding slot fixed to the wall or floor, said clamping hook being suitable for being operated by an electro-hydraulic device, and said device being capable of communicating with the system's central control unit. In the vicinity of said robotic arm 2, the system according to the present invention also comprises a disassembly station 60. Said disassembly station 60 comprises a supporting surface 61 and a plurality of control sensors suitable for detecting a plurality of data and transferring it to the robot's control unit.

According to a preferred embodiment of the system 1 according to the present invention, the disassembly station 60 comprises a plurality of sensors. At least one sensor 62 is preferably for checking for the presence of a cage, at least one control sensor 63 checks the orientation of the cage, and at least one sensor 64 checks for the presence of the feeder. Said sensor 64 for checking for the president of a feeder may consist of an inductive sensor, for instance, that is capable of identifying the presence of any metal material. In fact, the lab animal containment cages are generally made of plastic, while the feeder is normally the only component of the cage to be made of metal.

Moreover, there is at least one blocking actuator 65 designed to retain the cage on the supporting surface 61, and a plurality of devices 66 to position the cage correctly on the supporting surface 61.

Figures 3, 4:
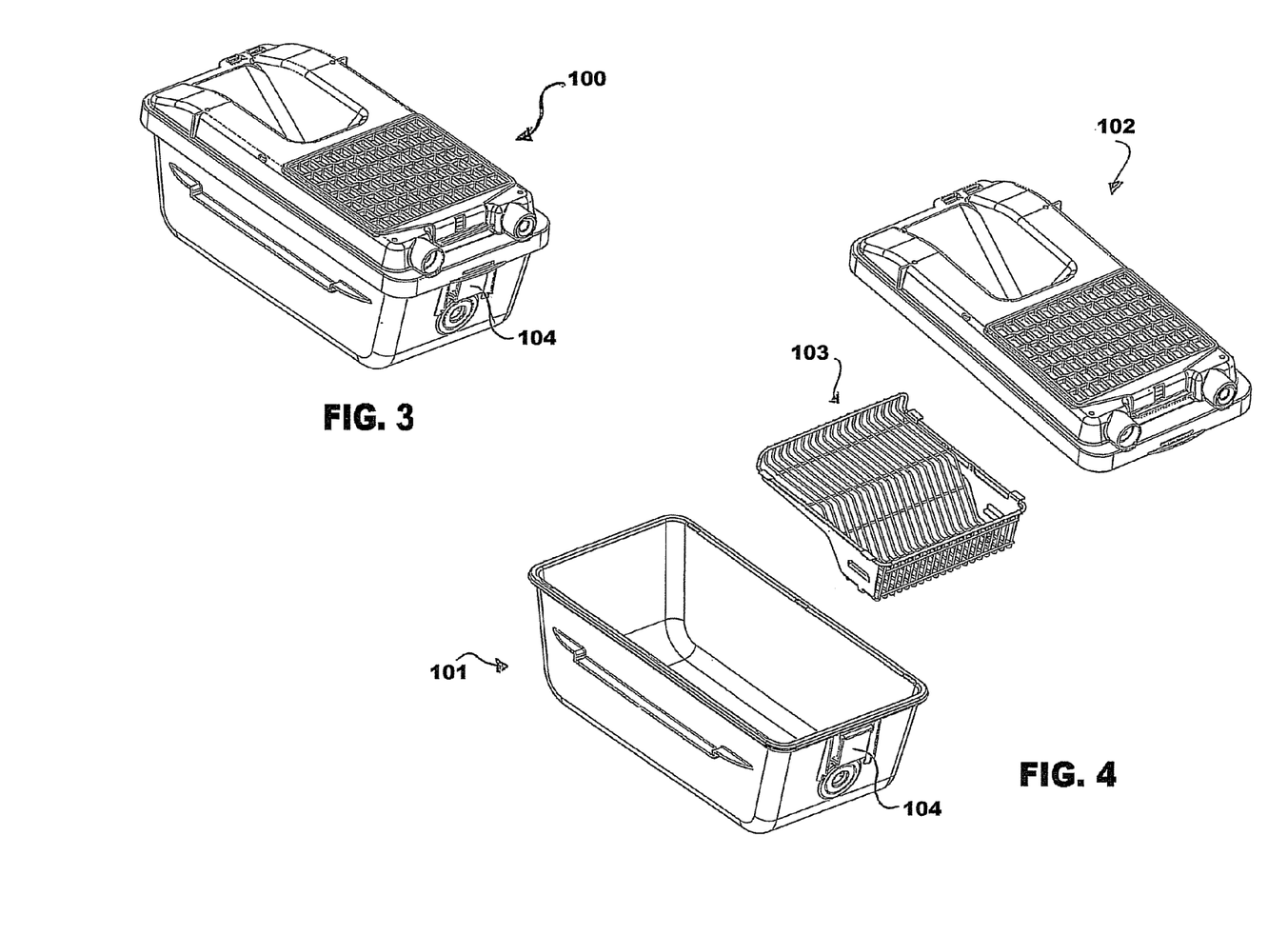
FIG. 3 shows a perspective view of a possible animal containment device suitable for being handled by the system according to the present invention.
FIG. 4 shows an exploded view of the same containment cage as in FIG. 3.

FIGS. 3 and 4 show an example of a lab animal containment cage suitable for handling by the system 1 according to the present invention. Said cage 100 consists substantially of three components, i.e. a tray 101 suitable for containing animals and for being filled with a material for use as bedding, a lid 102 suitable for closing the cage, and a feeder 103 that can consist of a metal grid, for instance.

According to the illustration shown as an example in the attached figures, the cage may be of the type comprising a closing system with a push button control 104 for releasing the lid. One type of cage widely used in lab animal rooms involves the presence of two buttons for releasing the lid, located on two opposite sides of the cage.

The disassembly station 60 comprises means for opening the cage, comprising an actuator 67, for instance, capable of releasing the lid 102 by means of a pressure on the buttons 104. There may be two of said actuators or, as in the example shown in the figures, there may be only one, the button concerned being pressed against a fixed plate 66.

The content illustrated herein as regards the lab animal containment cages may not be construed to limit the present invention in any way, because the cages may be of any, even very different shape, since the system 1 according to the present invention is easily adaptable to other types of cage.

Figure 8A:
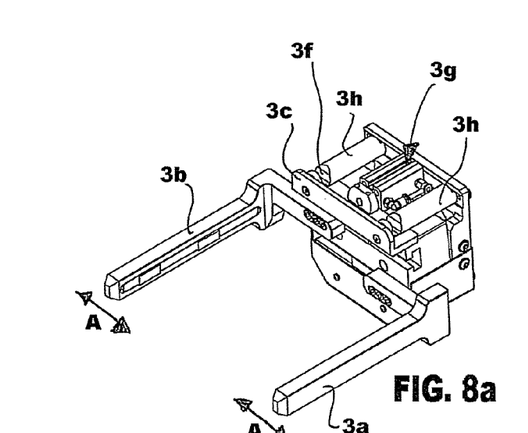
Figure 8B:
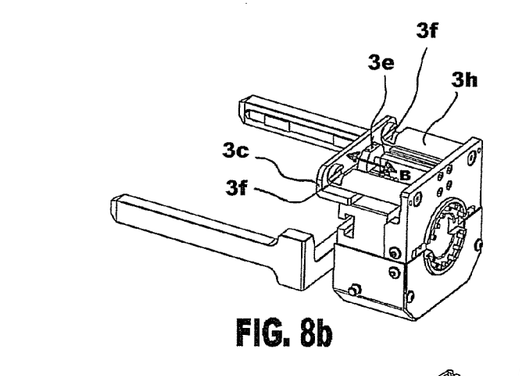
Figure 8C:
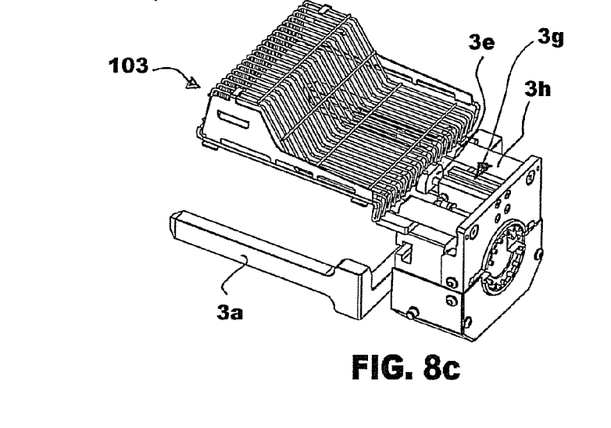
Figure 8D:
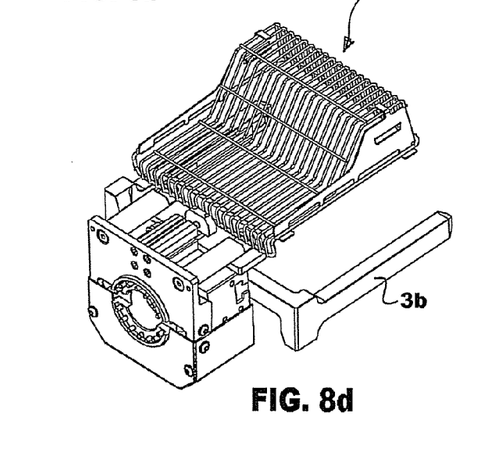
Figure 9:
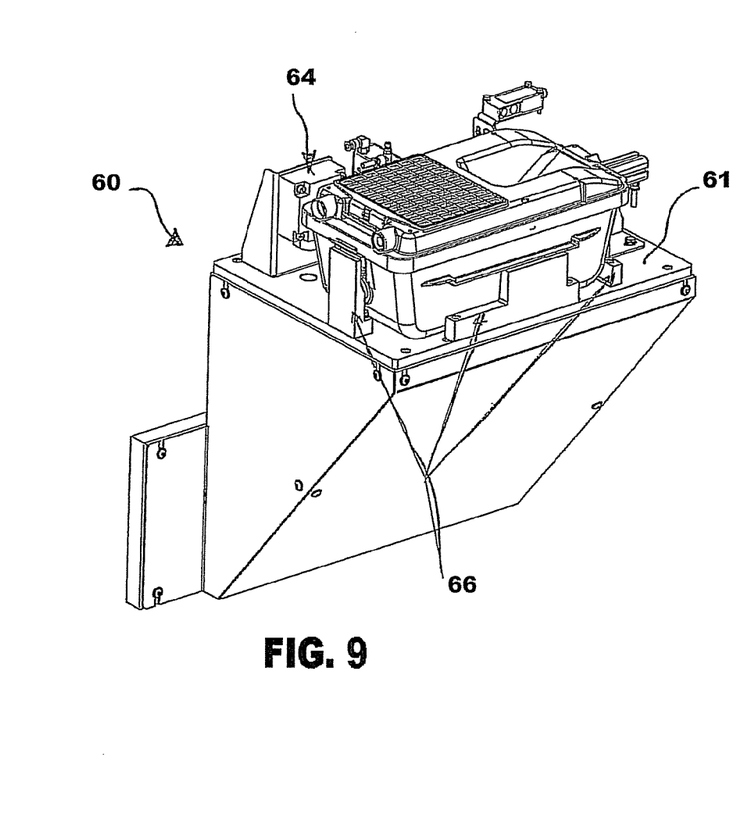
FIG. 9 shows a perspective view of the bench for supporting the system according to the present invention.
Figure 10:
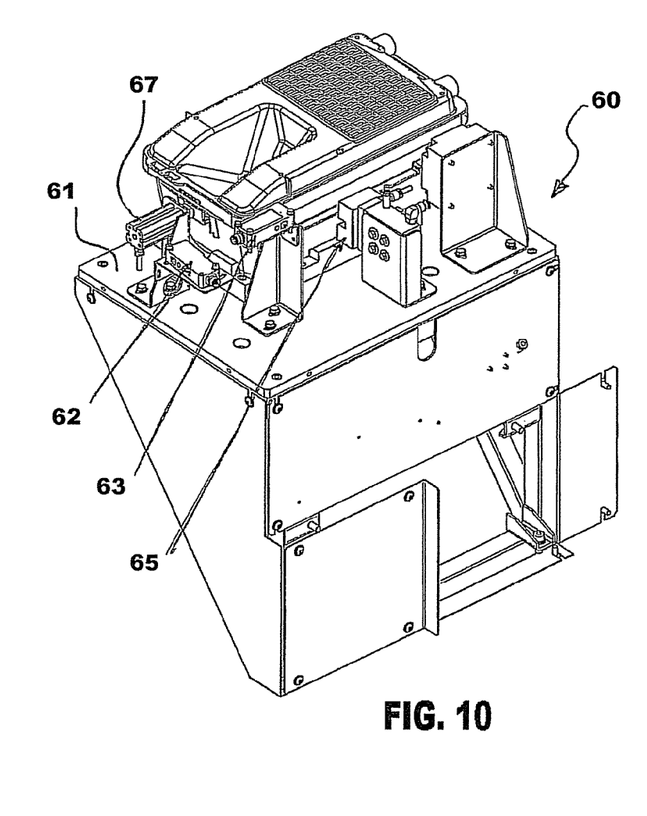
FIG. 10 shows a perspective view of the supporting bench in FIG. 9, as seen from a different angle.

With particular reference to figures from 5 to 8, and from 8a to 8d, the robotic arm 2 of the system 1 according to the present invention comprises a gripper 3 suitable for holding the whole cage and each single component thereof. According to the preferred embodiment illustrated, the gripper 3 comprises a head 3d with which cage gripping means are associated, said cage gripping means comprising, for instance, a clamp consisting of two jaws 3a and 3b slidingly associated with said head 3d in the direction identified by the arrows A in FIG. 8a, i.e. so that they can be moved closer together or further apart. With particular reference to figures from 8a to 8d, the gripping member 3 also comprises further gripping means for holding the feeder 103. Said gripping means for holding the feeder comprise at least one actuator 3g consisting of a piston terminating with a head 3e, first locator means 3h on the feeder 103 comprising, for instance, a pair of slots 3f designed to contain a stretch of the perimeter of said feeder 103, as shown in FIGS. 8c and 8d, and at least second locator means 3c shaped like a flange, for instance, against which said head 3e (that is movable perpendicularly to said locator means 3c, in the direction B of FIG. 8b) is designed to close the perimeter stretch of feeder positioned between the portions inserted in the two slots 3f. Being capable of movement perpendicular to said locator means 3c, said head 3e holds the feeder 103 by gripping a stretch of one of its ends.

The operation of the system 1 according to the present invention is as follows. The soiled cages are generally placed on a storage device that may, for instance, consist of a transport cart 20; they may be deposited in a storage area inside the lab animal room before they are carried to the area for the disassembly and emptying of the cages.

In the area where the cages are disassembled and emptied there is generally an extractor hood with a laminar flow 40 comprising a hopper 41 where the bedding or litter from the cage is collected, while the hood prevents the dispersion of any allergens in the environment.

Figures 5, 7:
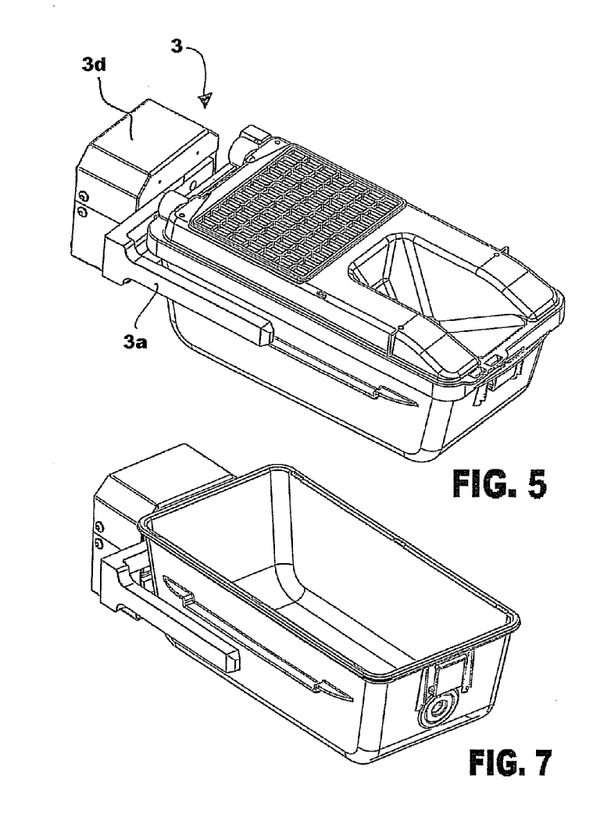
FIG. 5 shows a perspective view of the cage in FIG. 3, held by a mechanical gripping member forming part of the system according to the present invention.
FIG. 7 shows a perspective view of the tray forming part of the cage in FIG. 3, held by a mechanical gripping member forming part of the system according to the present invention.
Figures 6, 8:
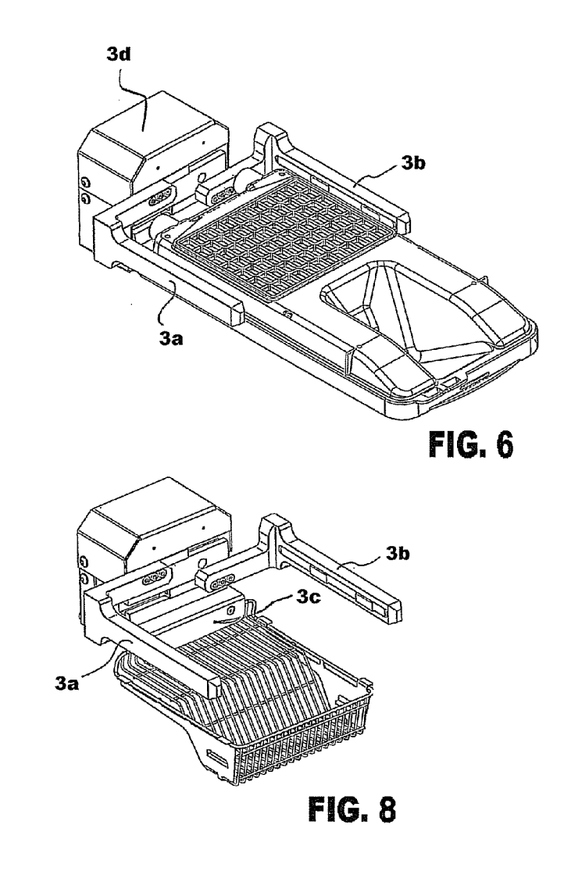
FIG. 6 shows a perspective view of the lid on the cage as in FIG. 3, held by a mechanical gripping member forming part of the system according to the present invention.
FIG. 8 shows a perspective view of the feeder in the cage as in FIG. 3, held by a mechanical gripping member forming part of the system according to the present invention; figures from 8a to 8d show perspective views and views from below of the gripping member forming part of the system according to the present invention.

The system according to the present invention enables the automated disassembly of the cages 100. The cages are collected from the transport cart 20 by the robotic arm 2, the cage being held by the gripping member 3 as shown in FIG. 5. The gripping action achieved by the two juxtaposed jaws 3a and 3b makes contact with the cage in line with two opposite lateral surfaces and the tightening of the jaws ensures the gripping of the cage.

While still assembled, the cage is thus deposited at the disassembly station 60 in line with locator devices 66 designed to orient its position. The sensors 62, 63 and 64 respectively detect the presence of a cage at the disassembly station 60, the orientation of said cage, and the presence of a feeder 103, and they transfer this information to the control unit governing the robotic arm 2. By means of a dedicated software, the control unit monitors the movements of the robotic arm and controls its operation.

Once the cage has been correctly positioned at the disassembly station 60, the blocking actuator 65 holds the cage in position on the surface 61. By means of the actuator 67, and the locator 66, which take effect on the buttons 104, the lid 102 of the cage is released from the tray 101, while the sensor 63 checks the orientation of the cage, so that the robotic arm can grasp the lid 102 in the correct position. Once o the lid 102 has been released, the gripping member 3 of the robotic arm 2 hold the lid 102 by means of the jaws 3a and 3b of the gripping member 3 and the lid is removed from the cage, the robotic arm 2 again moving on the strength of information relating to the orientation of the cage provided by the sensors at the disassembly station 60.

Figure 2:
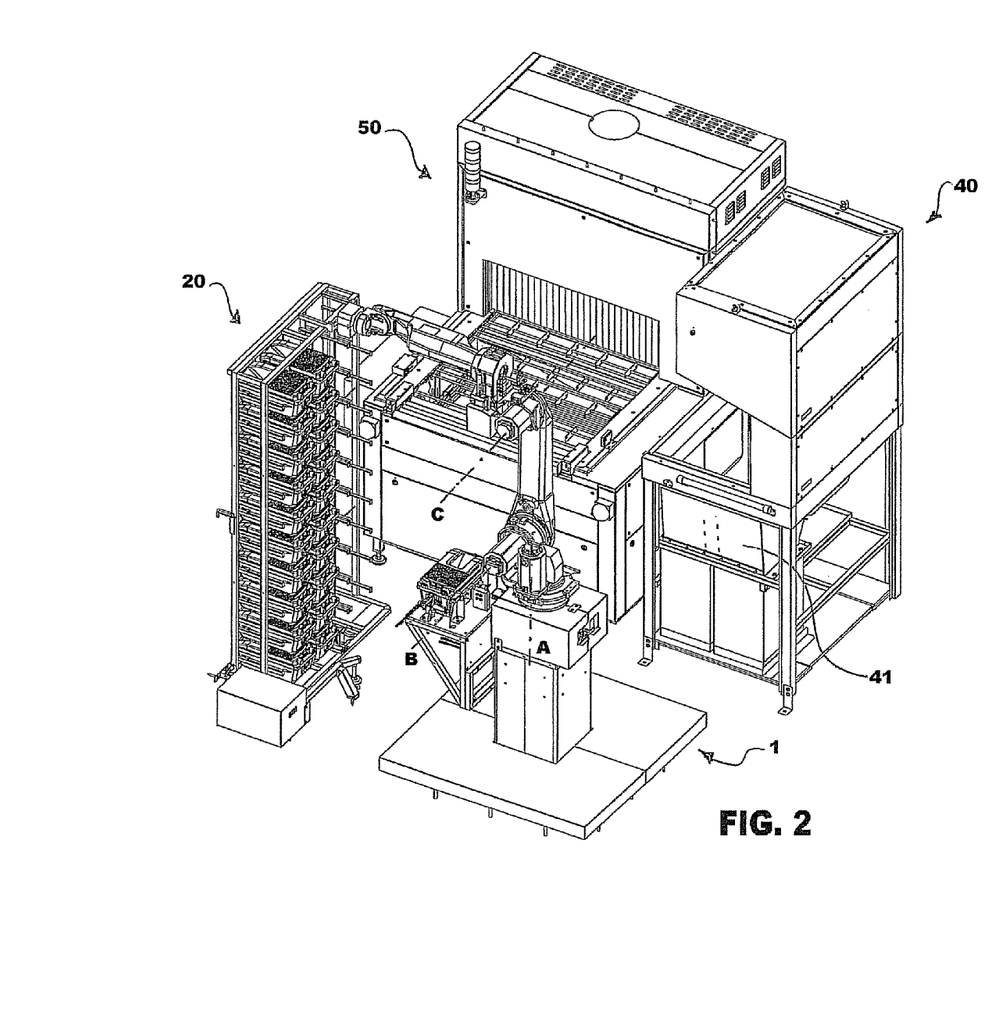
FIG. 2 shows an overall perspective view of the system according to the present invention in a possible embodiment suitable for application to a continuous washing process.

The robotic arm 2 can then deposit the lid on a cart or delivery shelf 30, in the case of a discontinuous washing procedure, as shown in FIG. 1, or directly on a conveyor belt leading into a tunnel washer 50, as shown in FIG. 2, in the case of a continuous washing procedure.

After disassembling and positioning the lid 102, the gripper 3 of the robotic arm 2 picks up the feeder 103 with the aid of the means for the feeder.

Here again, the sensor 64 for detecting the presence of the feeder informs the control unit of the presence or absence of the feeder so that the robotic arm can skip this phase if there is no feeder to remove.

If there is a feeder, the control software can make the robot turn the feeder 103 upside down, so that any contents in the feeder, e.g. any food scraps remaining on its surface, can drop back into the tray 101. After the robotic arm 2 has completed, where necessary, this procedure to empty the feeder 103 of any food scraps, it again deposits the feeder on the cart or delivery shelf 30 in the case of a discontinuous washing procedure, or directly on the conveyor belt leading into the tunnel washer 50, shown in FIG. 2, in the case of a continuous washing procedure.

Finally, the robot's gripping jaws 3a, 3b grasp the tray 101 (that has been released in the meantime from the constraint exerted by the blocking actuator 65), lifting the tray off the surface 61 of the disassembly station 60 and bringing it into line with the hopper 41 under the extractor hood with a laminar flow 40, where it is turned upside down in order to empty its contents into the hopper.

After the tray has been emptied, it too is loaded onto the cart or delivery shelf 30 in the case of a discontinuous washing procedure, or directly onto the conveyor belt for delivery to the tunnel washer 50 in the case of a continuous washing procedure.

This sequence of operations or disassembly of the cages and emptying of the bedding contained in the trays is repeated automatically by the robot for every cage contained on the transport shelf 20, or other generic storage structure, and a tray sensor can be suitably provided in line with the gripper 3 too, so that the system automatically identifies the presence of a cage on the storage shelf.

In the case of a discontinuous washing procedure, it will then be up to the operator to collect the delivery cart 30 on which the disassembled cages are located and place them in a washing machine of known type, whereas in the case of a continuous washing procedure, in which the disassembled cage components are positioned on the conveyor belt leading into the tunnel washer 50, a similar system, based on the content of the present invention, comprising a robotic arm and a re-assembly station can be provided at the outlet from the tunnel washer so as to automate the procedure for the reassembly of the cages too, after they have been washed—procedures that otherwise have to be completed by hand.

It has thus been demonstrated that the coupling according to the present invention achieves the previously-stated technical aim and objects.

In particular, it has been demonstrated that the system according to the present invention enables the completely automated disassembly and emptying of the cages without any need for the operator to take any manual action, thereby optimising the research personnel's activities at the laboratory by leaving them free to dedicate themselves to their research activities.

Another object achieved by the system according to the present invention is that of drastically reducing the time it takes to disassemble, empty and wash the cages, with a consequent optimisation of the time available for the laboratory activities, and consequently also of the related costs.

Again, by means of the system according to the present invention, the currently-implemented manual activities that can increase the operators' risk of stress due to repetitive and boring movements are kept to a minimum, with a consequent improvement in the operators' working conditions.

In addition, the automated system reduces to a minimum any risk of the operator coming into contact with allergens and dust in relation to the devices used in the lab animal room to contain the animals and their bedding.

Numerous modifications may be made by a person skilled in the art without departing from the patent-protected scope of the present invention. For instance, the system according to the present invention may also be used to reassemble the cages at the end of the washing procedure.

A possible application might, for instance, include the presence of one system according to the present invention at the inlet to a continuous tunnel washer, such as the one described herein, and the presence of a second system according to the present invention that performs the same operations in reverse order, reassembling the cages when they exit from the tunnel washer.

Similarly, the reassembly of the cages might be handled automatically by the system according to the present invention, controlled by suitable software, also in combination with discontinuous washing machines.

The scope of the claims should therefore not be limited by the drawings or by the preferred embodiment illustrated as an example in the above description; the claims shall be deemed instead to include all the patentable novel characteristics deducible from the present invention, including all those characteristics that would be considered as equivalent by a person skilled in the art.

The invention claimed is:

1. A system to handle animal cages in an animal room, said animal cages including at least a cage bottom and a cage lid, the system comprising:
   automated device to handle, move and disassemble said cages;
   a disassembly station to lay said cages during disassembly, said disassembly station provided with one or more detection sensors to detect cage presence and cage positioning parameters;
   a control unit of said automated device receiving signals corresponding to positioning parameters detected by said one or more detection sensors and controlling said automated device according to said positioning parameters,
   wherein said automated device opens the case lid and disassembles at least the cage bottom and cage lid.

2. The system according to claim 1, wherein said automated device comprises a robot arm provided with a gripper.

3. The system according to claim 2, wherein said gripper includes a head with an associated grip for picking up said animal cages or other parts of a cage and including at least two arms slidingly associated to the head in order for the two to be approached or separated.

4. The system according to claim 2, wherein said gripper also includes a feeder gripper to grip a feeder part of said cage.

5. The system according to claim 4, wherein said feeder gripper include at least a first device comprising one or more slots suitable to receive a portion of the feeder.

6. The system according to the claim 5, wherein said feeder gripper also include a second device comprising an element shaped as flange and positioned in front of the head of the gripper.

7. The system according to claim 6, wherein said feeder gripper also include an actuator suitable to move the head, in a direction substantially perpendicular to the flange direction, and the head is able to tightly fit against the device at least at a peripheral section of the feeder.

8. The system according to claim 7, wherein said one or more detection sensors of said disassembly station includes a cage presence control sensor.

9. The system according to claim 8, wherein said one or more detection sensors of said disassembly station includes a cage orientation control sensor.

10. The system according to claim 9, wherein said one or more detection sensors of said disassembly station includes a feeder presence detection sensor.

11. The system according to claim 10, wherein the disassembly station further comprises a locking actuator constructed and arranged to securely hold a cage on the plane of said disassembly station and positioning apparatus constructed and arranged for correct positioning of the cage on the plane.

12. A method for handling animal cages in an animal room, said animal cages including at least a cage bottom and a cage lid, the method comprising the following steps:

Providing one or more cages, assembled or disassembled, on a supporting structure;

Providing a disassembly station to lay the cages during disassembly;

Providing, on said disassembly station, various sensors suitable to detect the position in the space and orientation of the assembled cages or disassembled components of the cages;

Providing a central control unit suitable to detect signals coming from sensors;

Providing an automated device for handling and/or moving the cages controlled by the central control unit on the basis of signals coming from the sensors, and Disassembling such cages with said automated device by the central control unit on the basis of signals coming from the sensors.

13. The method according to claim 12, further comprising the following steps:

Providing various cages assembled and ordered in a storage structure;

Pick up of a cage from said storage structure through automated devices for handling and moving cages and controlled by a central control unit;

Positioning of such cage by said automated handling devices on said disassembly station;

Detecting the presence and direction of the cage on the disassembly station by sensors communicating with the central control unit;

Unhooking a lid of the cage by one or more cage opening devices fit on this disassembly station and controlled by the central control unit;

Gripping, by the automated devices, the lid of such cage and its separation from the cage bottom by laying it on a cart or presentation rack for stacking disassembled cages or directly on a tunnel washer conveyor belt;

Detecting the presence of a feeder by a feeder detecting sensor communicating with the central control unit and, in case of feeder presence; grip, by the automated devices, of the feeder of the cage and its separation from the cage by laying it on a cart or presentation rack for the storage of disassembled cages or directly on a tunnel washer conveyor belt;

Gripping, by the automated devices, the cage bottom of the cage and its content emptying by overturning over a hopper collecting the bedding and conveying of the cage bottom on a cart or presentation rack for colleting disassembled cage bottoms or directly on a tunnel washer conveyor belt; and Repeating the previous stages for each cage stacked in the storage device.

14. A method according to claim 12, comprising the following steps:

Providing one or more disassembled cages, on said disassembly station ;

Detecting, by a series of sensors or by a presence detecting system, the position in the space and the direction of the disassembled components of such cages; and Assembling the components of the cages by the automated devices controlled by the central control unit on the basis of signals coming from the sensors.

* * * * *